(12) United States Patent
Moyal et al.

(10) Patent No.: US 12,388,727 B2
(45) Date of Patent: Aug. 12, 2025

(54) INFORMATION TECHNOLOGY (IT) POWERED BY ARTIFICIAL INTELLIGENCE (AI)

(71) Applicant: Atera Networks Ltd, Tel Aviv (IL)

(72) Inventors: Oshri Moyal, Yavne (IL); Bar Maltabashi, Rehovot (IL); Elad Shmuel Elram, Sansana (IL)

(73) Assignee: Atera Networks Ltd, Tel Aviv (IL)

(*) Notice: Subject to any disclaimer, the term of this patent is extended or adjusted under 35 U.S.C. 154(b) by 0 days.

(21) Appl. No.: 18/383,947

(22) Filed: Oct. 26, 2023

(65) Prior Publication Data
US 2025/0141765 A1    May 1, 2025

(51) Int. Cl.
*G06F 15/173*  (2006.01)
*H04L 41/50*  (2022.01)
*H04L 41/5041*  (2022.01)

(52) U.S. Cl.
CPC ...... *H04L 41/5048* (2013.01); *H04L 41/5032* (2013.01)

(58) Field of Classification Search
CPC .............. H04L 41/5048; H04L 41/5032
See application file for complete search history.

(56) References Cited

U.S. PATENT DOCUMENTS

| | | | |
|---|---|---|---|
| 11,818,087 B1* | 11/2023 | Palki | H04L 51/18 |
| 2021/0216655 A1* | 7/2021 | Peschka | H04L 41/046 |
| 2022/0156134 A1* | 5/2022 | Lehmann | G06F 11/3476 |
| 2023/0124889 A1* | 4/2023 | Robert Jose | G06F 40/226 |
| | | | 704/9 |

OTHER PUBLICATIONS

WIPO, International Search Report and Written Opinion for PCT/IB2024060622, dated Dec. 18, 2024.

* cited by examiner

*Primary Examiner* — Padma Mundur
(74) *Attorney, Agent, or Firm* — Miller Johnson

(57) ABSTRACT

A system for automatically resolving information technology (IT) issues, comprising a plurality of client devices each executing a respective local IT assistance agent, and one or more remote servers communicatively coupled to the plurality of client devices via one or more network and adapted to execute an IT assistance engine. The IT assistance engine is adapted to receive, from the local IT assistance agent executed by one or more client devices, an assistance request for resolving one or more IT issue relating to the client device, collecting system data relating to the IT issue(s), using Machine Learning model(s) applied to analyze the system data to automatically determine one or more resolution profiles comprising a set of actions implementing one or more solutions for resolving the IT issue(s), and transmitting the resolution profile(s) to one or more agents adapted to execute automatically the set of actions to resolve the IT issue(s).

19 Claims, 8 Drawing Sheets

INFORMATION TECHNOLOGY (IT) POWERED BY ARTIFICIAL INTELLIGENCE (AI)

FIELD AND BACKGROUND OF THE INVENTION

The present invention, in some embodiments thereof, relates to resolving IT issues relating to remote client devices, and, more specifically, but not exclusively, to using Artificial Intelligence (AI) for automatically resolving IT issues relating to remote client devices.

In the modern world most businesses, systems, infrastructures, and services have become digital and thus heavily rely on computing resources.

As such, IT professional support is an essential need and challenge for practically any organization, company, institution, and/or the like to efficiently resolve IT issues encountered by employees, users, customers, sub-contractors, and/or the like in order to ensure effective, reliable, rapid, availability, accessibility, and/or the like of products and services offered by such entities.

SUMMARY OF THE INVENTION

According to a first aspect of the present invention there is provided a system for automatically resolving information technology (IT) issues, comprising a plurality of client devices each executing a respective local IT assistance agent, and one or more remote servers communicatively coupled to the plurality of client devices via one or more network. The one or more remote servers are adapted to execute an IT assistance engine for:

Receiving, from the local IT assistance agent executed by one or more of the plurality of client devices, an assistance request for resolving one or more IT issue relating to the one or more client devices.

Collecting system data relating to one or more IT issues.

Automatically determining one or more resolution profiles using one or more Machine Learning models applied to analyze the system data. The one or more resolution profiles comprise a set of actions implementing one or more solutions for resolving the one or more IT issues.

Transmitting the one or more resolution profiles to one or more agents adapted to execute automatically the set of actions to resolve the one or more IT issues.

According to a second aspect of the present invention there is provided a method of automatically resolving information technology (IT) issues comprising using an IT assistance engine executed by one or more servers communicatively coupled via one or more networks to a plurality of client devices each executing a respective local IT assistance agent. The IT assistance engine is adapted for:

Receiving, from the local IT assistance agent executed by one or more of the plurality of client devices, an assistance request for resolving one or more IT issues relating to one or more of the client devices.

Collecting system data relating to one or more IT issues.

Automatically determining one or more resolution profiles using one or more machine learning models applied to analyze the system data. The one or more resolution profiles comprise a set of actions implementing one or more solutions for resolving the one or more IT issues.

Transmitting the one or more resolution profiles to one or more agents adapted to execute automatically the set of actions to resolve the one or more IT issues.

According to a third aspect of the present invention there is provided a client device, comprising one or more processors adapted to execute a local IT assistance agent adapted to communicate via one or more networks with a remote IT assistance engine executed by one or more remote servers. The local IT assistance agent is adapted for:

Identifying one or more IT issues relating to the client device.

Transmitting an assistance request to the remote IT assistance engine for resolving the one or more IT issues.

Receiving one or more resolution profiles from the remote IT assistance engine. The one or more resolution profiles are determined automatically by the remote IT assistance engine using one or more machine learning models applied to analyze system data collected by the remote IT assistance engine in relation to the one or more IT issues. The one or more resolution profiles comprise a set of actions implementing one or more solutions for resolving the one or more IT issues.

Executing automatically the set of actions to resolve the one or more IT issues.

In a further implementation form of the first, second and/or third aspects, the one or more IT issues relate to one or more of:

One or more of a plurality of functional components of the one or more client device. Each of the plurality of functional component is implemented via hardware, software and/or a combination thereof.

One or more remote services serving one or more of the client devices.

One or more infrastructures serving one or more of the client devices.

In a further implementation form of the first, second and/or third aspects, at least part of the system data is derived from one or more tests conducted according to the one or more IT issues.

In a further implementation form of the first, second and/or third aspects, one or more of the tests are defined by one or more machine learning models trained to estimate usefulness of system data derived from the one or more tests for resolving the one or more IT issues.

In a further implementation form of the first, second and/or third aspects, the one or more agents adapted to execute automatically the set of actions to resolve the one or more IT issues are members of a group comprising: the local IT assistance agent executed by the one or more client devices, and/or one or more remote agents executed by one or more servers having access to one or more remote services and/or infrastructures serving one or more of the client devices.

In a further implementation form of the first, second and/or third aspects, the system data comprises informative data collected by the local IT assistance agent executed by one or more of the client devices. The informative data comprises one or more operational parameters relating to one or more of a plurality of functional components of the respective client device, a software application, a service, and/or an account related to the respective client device. Each of the plurality of functional components is implemented via hardware, software and/or a combination thereof.

In a further implementation form of the first, second and/or third aspects, the system data comprises service data collected from one or more remote services serving one or more of the client devices.

In a further implementation form of the first, second and/or third aspects, the system data comprises user behavior data collected by the local IT assistance agent. The user behavior data logs user interaction with one or more of the client devices.

In a further implementation form of the first, second and/or third aspects, the system data comprises user input relating to the one or more IT issues. The user input collected by the local IT assistance agent is provided by a user of one or more of the client devices.

In a further implementation form of the first, second and/or third aspects, the IT assistance engine is adapted to apply natural language processing for interpreting the user input.

In an optional implementation form of the first, second and/or third aspects, the IT assistance engine is further adapted to invoke one or more chat interfaces for interacting with a user of one or more of the client devices to receive the user input.

In a further implementation form of the first, second and/or third aspects, the one or more machine learning models use one or more datasets associating one or more of a plurality of resolution profiles with each of a plurality of client device IT issues.

In a further implementation form of the first, second and/or third aspects, one or more of the resolution profiles associated with one or more of the plurality of client device IT issues comprises a respective set of actions defined by one or more technicians for resolving the one or more IT issues.

In a further implementation form of the first, second and/or third aspects, one or more of the machine learning models comprise one or more generative machine learning models adapted to automatically define the set of actions for resolving the one or more IT issues.

In an optional implementation form of the first, second and/or third aspects, the IT assistance engine is further adapted to generate an IT issue summary based on the system data for display by a technician client device used by one or more technicians to enable the one or more technicians to adjust the one or more resolution profiles.

In an optional implementation form of the first, second and/or third aspects, the IT assistance engine is further adapted to store the system data in one or more online storage resources accessible to one or more technicians using a client device executing a web based graphical user interface.

In an optional implementation form of the first, second and/or third aspects, the IT assistance engine is further adapted to estimate an operational state of one or more of a plurality of functional components relating to one or more of the plurality of client devices based on system data collected in relation to the one or more client devices. Each of the plurality of functional components is a local functional component of one or more of the client devices and/or a remote functional component serving the one or more of the client devices.

In a further implementation form of the first, second and/or third aspects, the local IT assistance agent is implemented by a member of a group consisting of: a web page rendered by one or more web browsers, a web application, and/or a local application.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
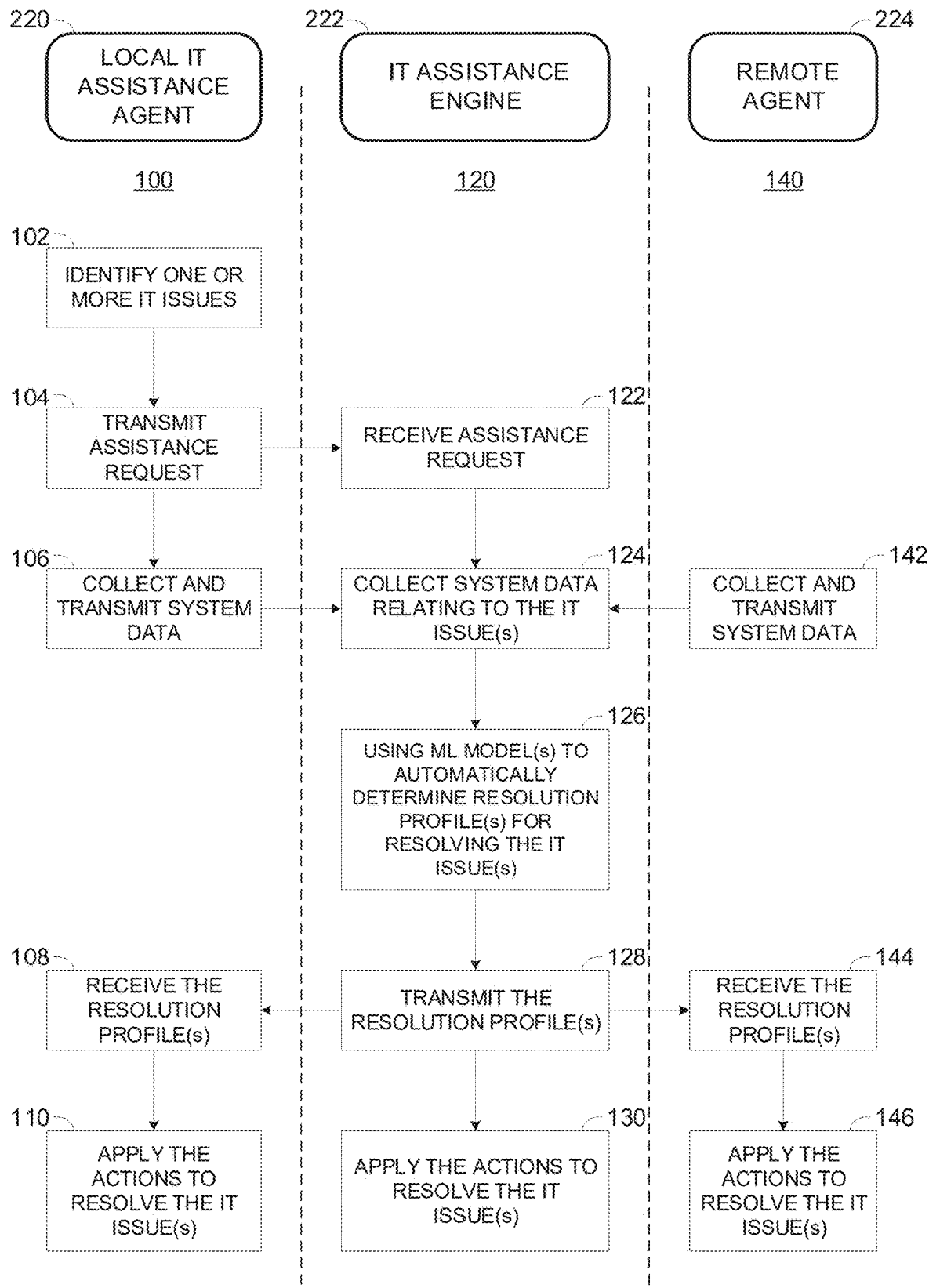
FIG. 1 is a flowchart of an exemplary process of automatically resolving IT issues using machine learning models, according to some embodiments of the present invention.

The present invention, in some embodiments thereof, relates to resolving IT issues relating to remote client devices, and, more specifically, but not exclusively, to using AI for automatically resolving IT issues relating to remote client devices.

According to some embodiments of the present invention, there are provided methods, systems, devices and computer software programs for automatically resolving IT issues relating to one or more client devices, such as, for example, a desktop, a laptop, a server, a Smartphone, a tablet, a smart watch, a proprietary client device and/or the like.

In particular, AI in the form of one or more Machine Learning (ML) models is used to identify, determine, and/or generate solutions for resolving one or more of the IT issues relating to the client devices.

A remote IT assistance system, typically a cloud based system, may use one or more ML models, for example, a neural network, a classifier, a statistical a classifier, a Support Vector Machine (SVM), and/or the like adapted to automatically determine and/or generate one or more resolution profiles comprising a set of actions implementing one or more solutions estimated to resolve each of a plurality of IT issues relating to one or more of the client deices.

Optionally, the IT assistance system may access one or more pre-trained generative ML models, for example, ChatGPT, Bard, and/or the like which may be prompt to compute resolution profiles for resolving one or more IT issues relating to one or more of the client deices.

The ML models may determine and/or generate the resolution profiles based on analysis of system data relating to each IT issues of a respective client device which may be collected from the client device and/or from one or more services and/or infrastructures serving the client device.

The system data may include, for example, informative data collected by local IT assistance agent executed by the respective client device which may comprise, for example, one or more operational parameters relating to one or more of a plurality of functional components of the respective client device, for example, hardware components, software components, and/or a combination thereof. In another example, the system data may include informative data and/or service data collected from one or more remote services and/or one or more of infrastructure systems serving the respective client device.

The system data may further comprise user behavior data collected by the local IT assistance agent, for example, user interaction with Human Machine Interfaces (HMI) of the respective client device, resources (e.g., screens, web pages, applications, menus, etc.) accessed by a user of the respective client device, items selected, clicked, and/or pointed by the user, and/or the like.

The system data may also include user input provided by the user of the respective client device, specifically user input provided in relation to one or more IT issues relating to the respective client device.

The system data relating to each IT issue may be injected into the ML model(s) which may identify one or more root causes of the IT issue according to learned system data patterns and may generate accordingly one or more resolution profiles which implement one or more solutions estimated to effectively resolve the respective IT issue.

One or more of the ML model(s) may be trained using one or more training datasets associating system datasets relating to a plurality of IT issues with respective resolution profiles which resolve the IT issues, for example, resolution profiles used in the past and proved to resolve the IT issues, resolution profiles defined by one or more experts (e.g., IT person, IT professional, etc.), and/or the like.

However, optionally, the ML model(s) may comprise one or more generative ML models which rather than identifying predefined resolution profiles, may generate resolution profiles based on a learned knowledge base of system data and IT resolution methods, techniques, protocols, and/or experience.

Automatically resolving IT issues for client devices may present major benefits and advantages over currently existing IT support methods and systems.

First, most if not all current IT support methods heavily rely on manual skills, expertise, experience and/or labor of human IT people, technicians and/or experts. Such manual IT support methods may present major limitations in terms of response time, resolution time, scalability, to name just a few due to limited human professional IT resources and the inherent limitations of human capacity to analyze large volumes of system data.

Automatically resolving IT issues relating to a plurality of client devices may efficiently overcome the limitations of the existing methods since it may efficiently resolve IT issues automatically with no human intervention. As such, since there is no need to wait for available IT human resources, IT issues may be quickly resolved with short response time. Also, since the IT issues are resolved automatically using high performance computing resources applied to analyze the system data, identifying, determining and/or generating resolution profiles for resolving the IT issues may be done extremely fast thus further reducing the overall response time for resolving the IT issues.

Moreover, automatically resolving IT issues may be highly scalable to support huge numbers of client devices since the remote IT assistance system, typically implemented via cloud resources, may be easily scaled to employ changing amounts of computing resources, ML resources, and/or the like according to changes in demand for IT assistance.

Furthermore, applying generative ML models may to generate resolution profiles for resolving IT issues may yield efficient resolution profiles not previously used and/or devised thus improving performance and/or scope of the automated IT support and also expanding the IT support domain.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of automatically resolving IT issues using machine learning models, according to some embodiments of the present invention.

An exemplary processes 100 may be executed by a local IT assistance agent executed by one or more client devices to resolve one or more IT issues relating to the respective client device.

In particular, the local IT assistance agent may cooperate with a remote IT assistance engine executed by one or more remote systems, servers, and/or services executing an exemplary process 120 to resolve IT issues relating to the client devices using AI, i.e., using one or more ML models.

The local IT assistance agent of a respective client device may issue one or more assistance requests to report one or more IT issues relating to the respective client device. One or more IT issues may relate, for example, to one or more functional components of the respective client device. In another example, one or more IT issues may relate to one or more services and/or infrastructures serving the respective client device.

In response to an assistance request received from the local IT assistance agent of a respective client device, the IT assistance engine may collect system data relating to the reported IT issue(s). System data may be collected, for example, from the respective client device, from one or more systems, platforms, and/or services serving the respective client device, and/or the like.

The IT assistance engine may apply one or more ML models to the collected data to determine automatically one or more solutions estimated to resolve the IT issue(s). The IT assistance engine may further compute a set of actions and/or instructions implementing the solution(s) and transmit the set to one or more agents adopted to automatically execute the set of actions in attempt to resolve the IT issue(s).

The agents adapted to receive and execute the set of actions for resolving the IT issue(s) may include, for example, the local IT assistance agent executed by the respective client device. In another example, one or more other agents, for example, agents deployed at one or more of the systems, platforms, and/or services serving the respective client device may be adapted to execute an exemplary process 140 for receiving and automatically executing the set of actions for resolving the IT issue(s).

Figure 2A:
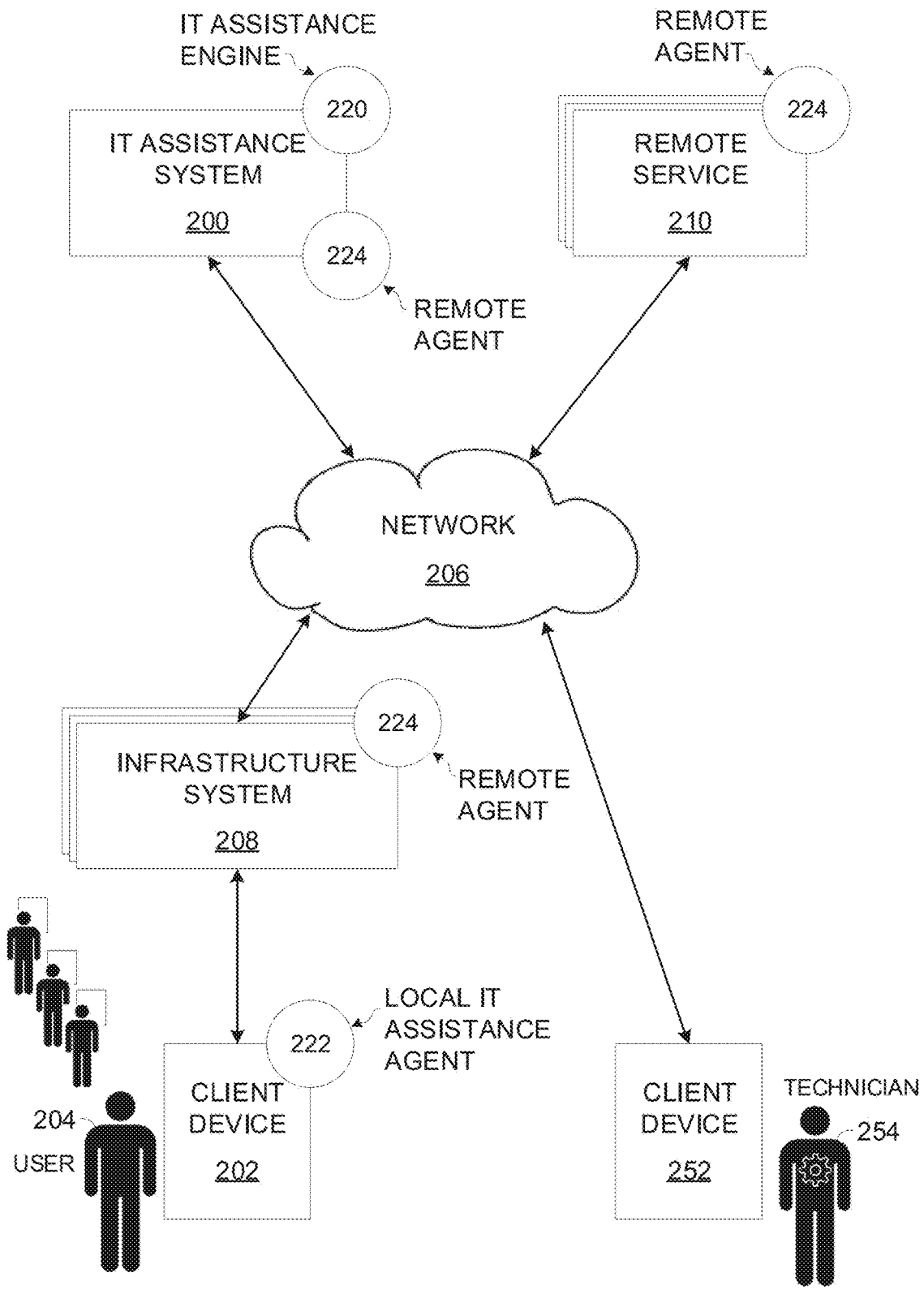
FIG. 2A and FIG. 2B are schematic illustrations of an exemplary system for automatically resolving IT issues using machine learning models, according to some embodiments of the present invention.
Figure 2B:
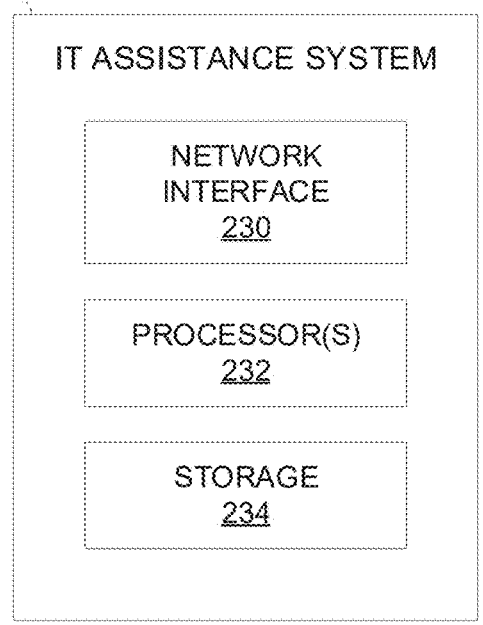
Figure 2B:
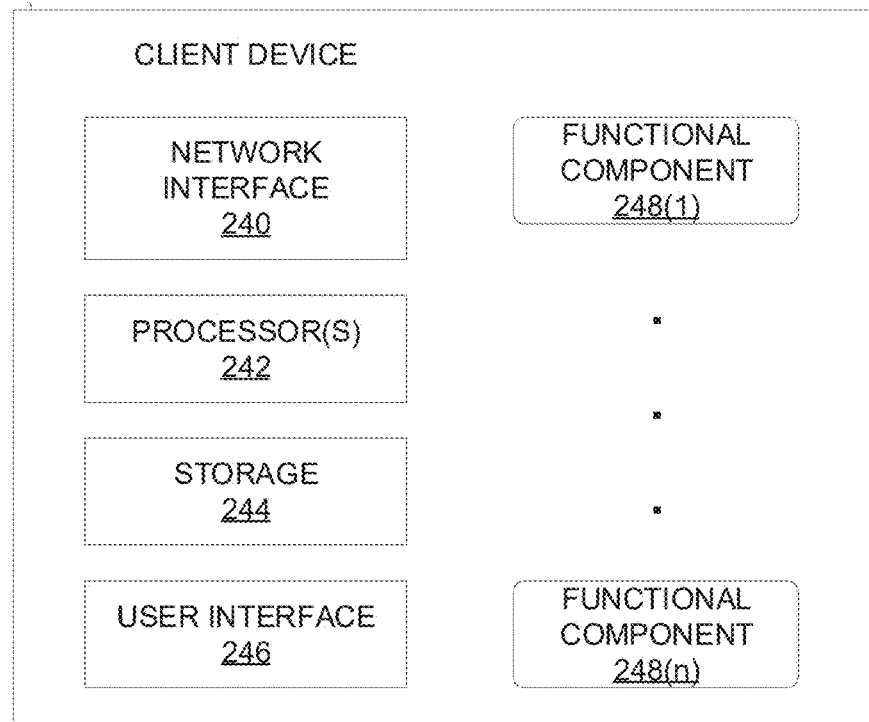

Reference is also made to FIG. 2A and FIG. 2B, which are schematic illustrations of an exemplary system for automatically resolving IT issues using machine learning models, according to some embodiments of the present invention.

As seen in FIG. 2A, an exemplary IT assistance system 200 may be adapted to support one or more client devices (remote machines) 202, for example, a desktop, a laptop, a server, a Smartphone, a tablet, a smart watch, a proprietary client device and/or the like for resolving IT issues relating to the client devices 202.

The client devices 202 may be typically associated with users 204 using, operating, and/or otherwise engaged with the client devices 202. However, one or more of the client devices 202 may be adapted to operate with no human intervention, for example, a server, a network equipment unit (e.g., gateway, router, switch, etc.), a security system and/or service (e.g., firewall service, IT system, etc.), and/or the like.

The client devices 202 may have network connectivity for connecting to one or more networks, designated network 206 herein after, comprising one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet and/or the like.

Optionally, one or more of the client devices 202 may connect to the network 206 via one or more infrastructure systems 208, for example, a network equipment system, unit, and/or service such as, for example, a gateway, a router, a switch, and/or the like, a security system and/or service such as, for example, a firewall, an access control unit and/or service, and/or the like.

The client devices 202 may communicate with the IT assistance system 200 over the network 206 to report IT issues they may encounter and optionally receive from the IT assistance system 200 instructions to automatically resolve these IT issues.

Also, via the network 206, one or more of the client devices 202 may communicate with one or more remote services 210, for example, a mail service, an organization account, a database, a Virtual Private Network (VPN) service, a Customer Relations Management (CRM) system, a subscription account (e.g., video conferencing, social media, financial service, etc.), and/or the like.

As seen in FIG. 2B, the IT assistance system 200, for example, a server, a processing node, a cluster of processing nodes, and/or the like may comprise a network interface 230 for connecting to the network 206, a processor(s) 232 for executing the process 120, and a storage 234 for storing data and/or code (program store).

The network interface 230 may include one or more wired and/or wireless network interfaces, ports, and/or links, implemented by hardware, software, firmware, and/or a combination thereof for connecting to the network 206.

The processor(s) 232, homogenous or heterogeneous, may include one or more processing nodes and/or cores optionally arranged for parallel processing, as clusters and/or as one or more multi core processor(s).

The storage 234 may include one or more non-transitory persistent storage devices, for example, a ROM, a Flash array, a Solid State Drive (SSD), a hard drive (HDD), and/or the like. The storage 234 may also include one or more volatile devices, for example, a RAM component, a cache, and/or the like. Optionally, the storage 234 may further comprise one or more network storage devices, for example, a storage server, a Network Accessible Storage (NAS), a network drive, a database server and/or the like accessible through the network interface 230.

The processor(s) 232 may execute one or more software modules such as, for example, a process, a script, an application, a (device) driver, an agent, a utility, a tool, an Operating System (OS), a plug-in, an add-on, and/or the like each comprising a plurality of program instructions stored in a non-transitory medium (program store) such as the storage 234 and executed by one or more processors such as the processor(s) 232.

The processor(s) 212 may optionally integrate, utilize and/or facilitate one or more hardware elements (modules) integrated and/or utilized in the IT assistance system 200, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU), an Artificial Intelligence (AI) accelerator and/or the like.

The processor(s) 232 may therefore execute one or more functional modules implemented using one or more software modules, one or more of the hardware modules and/or combination thereof.

For example, the processor(s) 232 may execute an IT assistance engine 220 for executing the process 120 for automatically determining solutions for resolving IT issues relating to one or more of the client devices 202. In another example, the processor(s) 232 may execute one or more ML models to support the IT assistance engine 220, for example, a Neural Network (NN), a classifier, a statistical a classifier, a Support Vector Machine (SVM), and/or the like adapted to automatically determine one or more solutions for resolving each of a plurality of IT issues relating to one or more of the client deices 202.

Optionally, the IT assistance system 200, specifically the processor(s) 232 may execute one or more agents 224, designated remote agents, to support resolution of one or more IT issues relating to one or more of the client devices 202, for example, collect system data relating to the IT issues, executing actions for resolving the IT issues, and/or the like as describe herein after in detail. Optionally, the remote agent 224 executed by the IT assistance system 200 may be integrated with the IT assistance engine 220 such that they may be deployed, launched and/or executed as a single package.

It should be noted, that each of functional modules executed by the processor(s) 232, for example, the IT assistance engine 220, the remote agent 224, and/or the like may be executed by the processor(s) 232 such that any one or more processors of the processor(s) 232 may execute one or more of the functional modules and/or part thereof or optionally not participate in execution of any of the functional modules.

Optionally, the IT assistance system 200 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like that may communicate with the client devices 202 via the network 202 for resolving one or more IT issues relating to one or more of the client devices 202.

Optionally, one or more of the remote services 210 and/or one or more of the infrastructure systems 208 may also execute one or more remote agents 224 for executing the process 140 to support resolution of one or more IT issues relating to one or more of the client devices 202, for example, collect system data relating to one or more IT issues, execute actions for resolving the one or more IT issues, and/or the like.

The remote agents 224 may be designed, implemented, and/or deployed to support resolution of one or more IT issues using one or more integration, migration, and/or development methods, techniques, and/or means. For example, one or more remote agents 224 may be implemented, and/or deployed using one or more plug-in modules, add-on packages, and/or the like comprising the IT issues resolution functionality. In another example, one or more remote agents 224 may be designed using one or more Software Development Kits (SDK) comprising the IT issues resolution functionality.

Each client device 202 may include a network interface 240 such as the network interface 230 for connecting to the network 206, a processor(s) 242 such as the processor(s) 232 for executing the process 100, and a storage 244 such as the storage 234 for storing data and/or code (program store).

One or more of the client devices 202, specifically client devices 202 which may be associated and operated by respective users 204 may further comprise a user interface 246 comprising one or more user interfaces, i.e. Human Machine Interfaces (HMI) for interacting with the user 204, for example, a keyboard, a mouse, a touchscreen, a touchpad, a pointing device, a display, a speaker, an earphone, a microphone, a tactile interface (e.g., fingerprint reader, etc.), and/or the like.

As described for the network interface 230, the network interface 240 may include one or more wired and/or wireless network interfaces, ports, and/or links, implemented by hardware, software, firmware, and/or a combination thereof for connecting to the network 206.

Also, similarly to the processor(s) 232, the processor(s) 242, homogenous or heterogeneous, may include one or more processing nodes and/or cores optionally arranged for parallel processing, as clusters and/or as one or more multi core processor(s). The storage 244 may include one or more non-volatile components, such as, for example, a ROM, a Flash array, an SSD, and/or the like and/or one or more volatile components such as, for example, a RAM device, a cache component, and/or the like.

The processor(s) 242 may execute one or more software modules each comprising a plurality of program instructions stored in a non-transitory medium (program store) such as the storage 234 and executed by one or more processors such as the processor(s) 232. Optionally, the processor(s) 242 of one or more of the client devices 202 may integrate, utilize and/or facilitate one or more hardware elements (modules) integrated and/or utilized in the respective client device 202, for example, a circuit, a component, an IC, an ASIC, an FPGA, a DSP, a GPU, an AI accelerator and/or the like.

The processor(s) 242 may therefore execute one or more functional modules implemented using one or more software modules, one or more of the hardware modules and/or combination thereof. For example, the processor(s) 242 of each client device 202 may execute an IT assistance agent 222 for executing the process 100 for resolving IT issues relating to the respective client device 202.

The local IT assistance agent 222 may be implemented at each of the client device using one or more architectures, designs, and/or deployments.

For example, the local IT assistance agent 222 executed by one or more of the client devices 202 may comprise a standalone local application executed by the respective client device 202, specifically by the processor(s) 242 of the respective client device 202. In another example, the local IT assistance agent 222 executed by one or more of the client devices 202 may be implemented by web application, hosted by one or more remote resources, for example, at the IT assistance system 200, which may be loaded and executed by the processor(s) 242 of the respective client device 202. In another example, the local IT assistance agent 222 executed by one or more of the client devices 202 may comprise a web browser (e.g., Chrome, Edge, Firefox. etc.) adapted to load and render one or more webpages hosted by one or more remote resources, for example, at the IT assistance system 200 which implement the logic of the local IT assistance agent 222.

The local IT assistance agent 222 may comprise and/or expose a user interface for interacting with the user 204, for example, a visual interface such as, for example, a Graphic User Interface (GUI), an audio input and/or playback interface, a tactile interface, and/or the like which may be presented and utilized via the user interface 246 of the client device 202. Moreover, one or more of the user interfaces, for example, the GUI may be implemented as a local GUI, a web based GUI, and/or a combination thereof according to the architecture, and/or deployment of the local IT assistance agent 222.

Each of functional modules executed by the processor(s) 242 of each client device 202, for example, the IT assistance agent 222 and/or the like may be executed by the processor(s) 242 of the respective client device 202 such that any one or more processors of the processor(s) 242 may execute one or more of the functional modules and/or part thereof or optionally not participate in execution of any of the functional modules.

Each client device 202 may comprise one or more one or more functional components 248, for example, N functional components 248(1) to 248(n) utilized by hardware, software, firmware, and/or a combination thereof to provide the functionality of the respective client device. The functional components 248 may obviously include the network interface 240, the processor(s) 242, and the storage 244.

The functional components 248 may include, for example, one or more hardware components, for example, a network device, a memory device, a processing circuit, a communication cable, and/or the like. In another example, the functional components 248 may include one or more software components (modules) executed by the processor(s) 242 and/or one or more other functional components 248 of the client device 202, for example, an Android OS, a communication application (e.g., communication stack, etc.), a remote access agent (e.g., web browser, VPN agent, web application, a local CRM agent, etc.), a control application (e.g., IoT management tool, an infrastructure monitor and control agent, etc.), and/or the like. In another example, the functional components 248 may include a combination of one or more hardware components and one or more software components.

Optionally, one or more technicians 254, for example, an IT person, an IT expert, an administrator, and/or the like may use one or more client devices 252 such as the client device 202 for connecting to the network 206 and interact with the IT assistance engine 220. Optionally, one or more technicians 254 using their client devices 252 may further access one or more clients devices 202, one or more of the remote services 210, and/or one or more infrastructure systems 208.

For brevity, the processes 100, 120, and 140 are described for resolving IT issues relating to a single client device 202. This, however, should not be construed as limiting since, as may be apparent to a person skilled in the art, the process 100 may be executed by a plurality of client devices 202 and the process 120, and optionally the process 140, may duplicated, expanded, and/or scaled for resolving IT issues relating to the plurality of client devices 202.

As shown at 102, the process 100 executed by the local IT assistance agent 222 of a client device 202 starts with the local IT assistance agent 222 identifying one or more IT issues relating to the client device 202.

The IT issues may relate to one or more failures and/or problems encountered in relation to the client device 202 and/or its associated user 204. In particular, IT issues may relate may relate to one or more of the functional components 248 of the client device 202, to one or more software applications executed by the client device 202, one or more services accessed by the client device 202, one or more accounts related to the client device 202, and/or the like. Moreover, since at least some of the IT issues may relate to interaction and communication between the client device 202 and one or more remote services 210, the IT issues may relate to one or more of the infrastructure systems 208.

For example, a certain IT issue may relate to inability of a user 204 associated with the client device to log into and/or access his account using his credentials, whether an account at a remote service 210 (e.g., mail service, remote desktop, cloud service, etc.), and/or a local account of an application and/or service executed locally by the client device 202 (e.g., secure service, encrypted document, etc.). In another example, a certain IT issue may relate to inability of the client device 202 to access the network 206, and/or a certain remote service 210. In another example, a certain IT issue may relate to a failure to invoke one or more applications, agents, and/or the like, for example, a VPN client, a text editing application, a simulation model, and/or the like.

However, the IT issues may not be limited to problems, and/or failures relating to the client device 202. Rather, the IT issues may further include one or more requests to add, include, expand, remove and/or otherwise manipulate capabilities, functionality, and/or features of the client device 202 and/or for making them available to the associated user 204. For example, a certain IT issue may relate to a request to add the associated user 204 to a certain admin group. In another example, a certain IT issue may relate to installing and configuring a VPN agent on the client device 202. In another example, a certain IT issue may relate to a request to create a new account for the user 204 at one or more remote services 210, change credentials for one or more accounts, and/or the like.

The IT issues may be identified by the local IT assistance agent 222 using one or more methods, techniques, and/or algorithms.

For example, the user 204 may interact with the local IT assistance agent 222 to report one or more IT issues. To this end, the user 204 may interact with the local IT assistance agent 222 via one or more of the HMI interfaces, for example, the GUI, and/or the like of the user interface 246. In another example, one or more functional components 248, for example, an application, an agent, a device driver, and/or the like may report a failure to the local IT assistance agent 222, for example, via one or more system calls, OS routines, Application Programming Interface (API) functions, and/or the like. In another example, the local IT assistance agent 222 may continuously, and/or periodically monitor one or more of the functional components 248, one or more of the remote services 210, and/or one or more of the infrastructure systems 208 to detect one or more IT issues. For example, the local IT assistance agent 222 may issue one or more system calls, API calls, and/or the like to probe one or more of the functional components 248 and determine their functional and/or operational state accordingly. In another example, the local IT assistance agent 222 may transmit one or more messages, requests, and/or signals to one or more of the services 210, and/or infrastructure systems 208 to evaluate their availability, connectivity, functionality, and/or the like and determine their functional and/or operational state accordingly.

As shown at 104, the local IT assistance agent 222 may transmit to the IT assistance system 200, specifically to the IT assistance engine 220 an assistance request, via the network 206, for example, a message, a packet, an alert, and/or the like to report the identified IT issue(s) and request support to resolve the IT issue(s).

As shown at 122, the IT assistance engine 220 may receive the assistance request transmitted from the client device 202 by the local IT assistance agent 222.

As shown at 124, in response to receiving the assistance request, the IT assistance engine 220 may collect system data relating to the IT issue(s) reported in the assistance request.

The system data may include, for example, informative data collected by the local IT assistance agent 222 as shown at 106 and transmitted to the IT assistance engine 220. The informative data collected by the local IT assistance agent 222 may comprise, for example, one or more operational parameters relating to one or more of the plurality of functional components 248 of the client device 202, for example, a hardware component, a software component, and/or a combination thereof. For example, the informative data collected by the local IT assistance agent 222 may include one or more operational parameters, status data, and/or settings of one or more functional components, for example, a network adapter, a processing device, a network port, an application, a communication protocol, and/or the like. In another example, the informative data collected by the local IT assistance agent 222 may comprise one or more operational parameters, status data, credentials, settings and/or the like of one or more accounts (e.g., user account at remote system, etc.), and/or services (e.g., mail server, etc.) accessed by the client device 202.

In another example, the system data may include informative data, specifically service data collected from one or more of the remote services 210 (e.g., mail server, CRM system, online financial service, etc.), one or more of the infrastructure systems 208 (e.g., router, gateway, etc.), and/or the like. Such informative data may include, for example, one or more operational parameters, status data, and/or settings relating to the one or more of the remote services 210, and/or infrastructure systems 208. For example, informative data relating to a certain remote service 210, for example, a mail server, may comprise, for example, availability, responsiveness, access latency, access port settings, and/or the like. In another example, informative data relating to a certain infrastructure system 208, for example, a gateway, may comprise, for example, one or more network parameters defined at the router, for example, domain, address ranges, protocol support, and/or the like.

This informative data relating to the remote services 210 and/or infrastructure systems 208 may be collected, for example, as shown at 142, by one or more of the remote agents 224 deployed and executed by one or more of the remote services 210 and/or infrastructure systems 208 and transmitted by the remote agents 224 to the IT assistance engine 220 over the network 206. In another example, the IT assistance engine 220 may access one or more of the remote services 210 and/or infrastructure systems 208 to directly retrieve at least some informative data relating to one or more of the remote services 210, and/or infrastructure systems 208.

Moreover, at least part of the system data may be derived one or more tests conducted to system tests, checks, and/or probes (health checks) to collect at least some of the system data, for example, informative data. such tests, may include, for example, functional tests of one or more of the functional components which may relate to the reported IT issue(s), for example, a functional component 248, one or more of the remote services 210, one or more of the infrastructure systems 208, and/or the like. One or more of the test conducted to collect, retrieve, and/or derive system data may be conducted automatically by directly communicating, for example, by the IT assistance engine 220 and/or the local IT assistance agent 222, with one or more hardware and/or software components of the tested resources. However, one or more tests may include interaction with the user 204 such that the user 204 may be instructed, for example, by the local IT assistance agent 222, via the user interface 246, to perform one or more actions and/or operations to support execution of one or more test procedures to collect, derive, and/or identify system data which may be useful, and/or relevant in relation to the reported IT issue(s). Such system data may include, for example, informative data derived from the tests, user input provided by the user 204 in response to instructions, a combination thereof, and/or the like.

The IT assistance engine 220 may therefore initiate, and/or instruct initiation of one or more one or more system tests to collect at least some of the system data, for example, informative data relating to the IT issue(s). For example, assuming the reported IT issue(s) relate to a network connectivity problem. In such case, the IT assistance engine 220 may initiate one or more tests, for example, hardware test procedures on one or more network controllers of the client device 202 to collect informative data relating to the network hardware. In another example, the IT assistance engine 220 may initiate one or more software and/or protocol level tests, for example, 'ping', 'open socket', and/or the like in order to collect informative data relating to connectivity status of the client device 202. In another example, the In another example, the system data user may comprise user behavior data collected by the local IT assistance agent 222, specifically user behavior data which may relate to the reported IT issue(s). The user behavior data may capture, record and/or log interaction of the associated user(s) 204 with the client device 202 and/or content rendered by the client device 202. For example, the user behavior data may include interaction of the user 204 with the HMI of the user interface 246, accessed resources (e.g., screens, web pages, applications, menus, etc.), selected items (e.g., clicked and/or pointed icons, links, menu items, etc.,), and/or the like. For example, assuming a user 204 interacts with his client device 202 to engage, use, and/or operate one or more applications, for example, an electronic mail application, an electrical design tool, a software programming suite, and/or the like, the user behavior data collected by the local IT assistance agent 222 may comprise interaction of the user 204 with the applications via the user interface 246, for example, mouse movement, keyboard strokes, sound commands, and/or the like. The user behavior data may further include timing data, for example, speed of interaction operations (mouse, keyboard, etc.), time gaps between interactions, and/or the like. The user behavior data may further log the interaction of the associated user(s) 204 over time and may arrange the interactions in an order according to their occurrence timing, sequence, and/or the like.

In another example, the system data user may comprise user input relating to the reported IT issues which is provided by one or more users 204 of the client device 202. The user input may be collected, for example, by the local IT assistance agent 222 and transmitted to the IT assistance engine 220 via the network 206. Optionally, in deployments in which the local IT assistance agent 222 is implemented by a web application, web based GUI, and/or a webpage executed by the IT assistance engine 220 and rendered by the local IT assistance agent 222, the IT assistance engine 220 may collect the user input provided by the user 204.

Optionally, the IT assistance engine 220 and/or the local IT assistance agent 222 may be adapted to invoke one or more chat interfaces, for example, GUI based chat bot, an audio based chat bot, and/or the like for interacting with the user 204 of the client device 202 to receive the user input.

The user input may include, for example, a description of an IT issue identified and/or encountered by the user 204 using the client device 202. In another example, the user input may include one or more contextual details relating to an IT issue identified and/or encountered by the user 204, for example, an operation mode of one or more functional components 248, one or more attributes of the execution environment of the client device 202, for example, suspicious effects, phenomena, and/or signs, an execution goal and/or target of one or more of the functional components 248, an execution load on the client device 202, and/or the like.

The IT assistance engine 220 may apply Natural Language Processing (NLP) for interpreting the user input. For example, the IT assistance engine 220 may apply one or more NLP algorithms to analyze the user input and/or part thereof in order to identify the use input.

Optionally, the user input may be provided by the user 204 in response to one or more queries, and/or questions presented to him via the user interface 246, for example, by the local IT assistance agent 222, and/or the IT assistance engine 220. For example, the IT assistance engine 220 may generate one or more guiding questions according to the reported IT issue(s) which may be presented to the user 204 by the local IT assistance agent 222 via the user interface 246.

The system data collected by the IT assistance engine 220, for example, a scope of data, a type of data, data details, and/or the like in relation to one or more IT issues may be predefined, for example, by one or more technicians such as the IT technicians 254. In another example, the system data collected by the IT assistance engine 220 in relation to one or more IT issues may be defined based on knowledge, and/or experience formed based on past IT issues resolution conducted, either by the IT assistance engine 220, by one or more IT technicians 254, using another IT tool, and/or the like.

Optionally, the system data (type, scope, parameters, etc.) collected by the IT assistance engine 220 in relation to one or more IT issues and/or part thereof may be learned over time and/or predicted using one or more ML models adapted and/or trained to identify system data patterns relating to one or more of the IT issues and learn which system data may be relevant for deriving possible solutions to resolve the respective IT issues. Such ML models are described in further detail herein after in step 126. In such case, at least part of the system data collected by the IT assistance engine 220 may be indicated, instructed, and/or otherwise identified by one or more of the trained ML models. For example, assuming the reported IT issue(s) relate to an inability to access a certain shared drive and/or folder. In such case, the IT assistance engine 220 may collect system data, for example, informative data defined, identified, and/or instructed by one or more of the ML model(s) which are trained to learn which system data may be relevant, useful, and/or beneficial to determine a root cause of the access issue and for determine possible solutions for resolving the access issue.

Moreover, the IT assistance engine 220 may initiate, conduct, and/or launch one or more system checks, tests, and/or probes (health checks) defined, indicated, and/or suggested by one or more of the ML model(s) which may be further adapted and/or trained to determine which tests may produce system data that may be relevant for deriving possible solutions to resolve one or more IT issues. For example, assuming the reported IT issue(s) relate to an failure of an application executed by the client device 202 to retrieve data from a remote network resource, for example, a database. In such case, the IT assistance engine 220 may conduct one or more tests (health checks) indicated, defined, and/or instructed by one or more of the ML model(s) which estimate these tests may produce system data, for example, informative data which may be relevant, useful, and/or beneficial for determining the root cause of the data retrieval issue and for determine possible solutions for resolving the access issue. For example, the ML model(s) may determine and/or estimate, based on learned data patterns relating to IT issues, that an access privileges test and/or inquiry conducted for testing the credentials used by the client device 202 to access the database and their access rights may yield system data useful for determining possible root cause problem of the access issue. The IT assistance engine 220 may therefore initiate the access privileges test and/or inquiry according to an indication and/or suggestion received from the ML model(s).

As shown at 126, the IT assistance engine 220 may automatically determine one or more resolution profiles using one or more ML models applied to analyze the collected system data. Each resolution profile may comprise a set of actions implementing one or more solutions for resolving the reported IT issue(s).

According to some embodiments, the IT assistance engine 220 may inject the system data into one or more ML models, for example, a neural network, a classifier, an SVM, and/or the like which are adapted to learn a plurality of system data patterns typical to IT issues relating to the client devices 202.

The ML model(s) may be further adapted to predict, and/or estimate one or more solutions for resolving the IT issues and generate one or more resolution profiles accordingly which include a set of actions implementing the solution estimated to resolve the IT issues.

The ML model(s) applied to a plurality of system data sets collected in relation to a plurality of IT issues may therefore estimate, and/or predict a root cause of one or more IT issues characterized by a respective system data, i.e., may be reflected, and/or may induce the respective system data set. The ML model(s) may be further adapted to generate accordingly one or more resolution profiles implementing one or more solutions predicted to resolve the estimated root cause and thus resolve the IT issue(s).

In particular, the ML model(s) may be applied to feature vectors each comprising a plurality of features extracted from a respective one of the system datasets by one or more feature extraction engines, interchangeably designated feature extractor. The feature extractor may be utilized, for example, as one or more independent ML models, for example neural networks, and/or integrated as one or more layers in one or more neural networks facilitating the ML model(s) themselves.

As such, the ML model(s) applied to the system data collected in relation to the IT issue(s) reported by the local IT assistance agent 222 may be used to determine automatically one or more resolution profiles implementing one or more solutions estimated to resolve the reported IT issue(s). Specifically, the ML model(s) may be applied to a feature vector comprising a plurality of features extracted by the feature extractor from the system data collected in relation to the reported IT issue(s). In deployments where the feature extractor is integrated and/or utilized by the ML model(s), the collected system data may be directly injected to the ML model(s).

The ML model(s) may be trained in one or more supervised, unsupervised, and/or semi-supervised training sessions using one or more training datasets comprising a plurality training samples. The training samples may comprise, for example, annotated (labeled) training samples for supervised training, unlabeled training samples for unsupervised training, and/or a combination of labeled and unlabeled training samples for semi-supervised training.

Each of the training samples may comprise a respective system dataset, optionally associated with one or more IT issues having a root cause characterized by the respective system dataset.

Moreover, at least some of the training samples, for example, the labeled training samples may associate one or more of a plurality of resolution profiles with each of a plurality of IT issues relating to client devices such as the client devices 202. Trained with such training samples, the ML model(s) may therefore, adapt, adjust, and/or evolve to learn which of the resolution profiles may be applied for resolving each of the IT issues.

For example, one or more of the resolution profiles may be associated with one or more IT issues based on past experience during which solutions and actions applied and executed for resolving IT issues were recorded. Each of the resolution profiles, specifically the set of actions of the respective resolution profile, previously recorded to successfully resolve one or more of the IT issues may be thus associated with the respective IT issue(s) and used for training the ML model(s).

In another example, one or more of the resolution profiles associated with one or more of the plurality of IT issues may comprise a respective set of actions defined by one or more technicians, for example, an IT person, an expert, an administrator, and/or the like for resolving the respective IT issues. For example, the set of actions of one or more of the resolution profiles may be derived from recordation of the actions applied by one or more technicians to resolve one or more IT issues in the past. In another example, the set of actions of one or more of the resolution profiles may be estimated by one or more technicians to resolve one or more IT issues.

The ML model(s) may be adapted to automatically determine and/or select one or more resolution profiles comprising sets of actions, optionally utilized by scripts, retrieved from one or more resolution repositories, for example, a database, and/or the like. Optionally, the ML model(s) may be adapted to determine and/or select one or more resolution profiles for one or more IT issue(s) based on an account associated with the client device 202, for example, an account of the user 204, an account assigned to the client device 202, an account of an organization with which the client device 202 and/rot he user 2-04 are associated. Each account may be associated with one or more respective resolution profiles each comprising a set of actions estimated to resolve the reported IT issue(s).

Optionally, the ML model(s) may include one or more generative ML models adapted to automatically define the set of actions of one or more resolution profiles estimated, predicted and/or selected for resolving the IT issue(s) reported by the local IT assistance agent 222.

The generative ML model(s) may be pre-trained and adapted to generate one or more resolution profiles which are not duplicates of previous resolution profiles applied in the past and/or estimated by technicians to resolve one or more IT issues. Rather, the generative ML model(s) may estimate, predict, infer, and/or derive, based on past knowledge and data, one or more sets of actions implementing one or more solutions estimated to resolve one or more IT issues and may generate one or more resolution profiles accordingly.

According to embodiments, the ML model(s) used by the IT assistance engine 220, may include one or more online AI services, for example, ChatGPT, Bard, and/or the like employing one or more pre-trained generative ML models, infrastructures and/or architectures adapted to for respond and provide answers to natural language queries also known as prompts.

The IT assistance engine 220 communicating with the online generative ML model(s), for example, via the network 206 and using their API, may inject to the online generative ML model(s) one or more prompts (queries) comprising the system data collected in relation to the IT issue(s) reported by the local IT assistance agent 222. In response, the online generative ML model(s) may estimate a root cause of the IT issue(s) and may generate one or more resolution profiles comprising one or more sets of actions implementing one or more solutions estimated, and/or predict to resolve the IT issue(s).

As shown at 128, the IT assistance engine 220 may transmit one or more of the resolution profile(s) generated, inferred, and/or determined by the ML model(s) to one or more agents adapted to execute automatically the set of actions of the resolution profile(s) to resolve automatically the IT issue(s) relating to the client device 202.

For example, as shown at 108, the IT assistance engine 220 may transmit one or more of the resolution profile(s) to the local IT assistance agent 222 executed by the client device 202. As shown at 110, the local IT assistance agent 222 may apply the set of actions of the received resolution profile(s) to resolve the IT issue(s).

For example, assuming the IT issue relating to the client device 202 is a network connectivity problem estimated, by the ML model(s) based on the system data, to originate from a failure, and/or a problem in a network interface of client device 202. Further assuming, a certain resolution profile, determined using the ML model(s), comprises a set of actions for reconfiguring, resetting, updating the network interface and/or the like. In such case, the IT assistance engine 220 may transmit the certain resolution profile to the local IT assistance agent 222 which may execute the set of actions at the client device 202 to resolve the network connectivity problem.

Optionally, the set of actions of one or more of the resolution profile(s) may include instructions for the user 204 of the client device 202 to take one or more actions. For example, assuming the IT issue relating to the client device 202 is a network connectivity problem estimated, by the ML model(s) based on the system data, to originate from a fatal failure in a network interface connecting the client device 202 to the network 206 via a network cable. Further assuming, a certain resolution profile, determined using the ML model(s), comprises a set of actions for connecting the network cable to another (different) network interface of the client device 202. In such case, the set of actions of the certain resolution profile may comprise instructions to the user 204 to disconnect the network cable from the currently connected network interface and connect the cable to the other network interface.

In another example, as shown at 144, the IT assistance engine 220 may transmit one or more of the resolution profile(s) to one or more of the remote agents 224 executed by one or more of the infrastructure systems 224 which may apply the set of actions of the received resolution profile(s), as shown at 146, to resolve the IT issue(s).

For example, assuming the IT issue relating to the client device 202 is a network connectivity problem estimated, by the ML model(s) based on the system data, to originate from a problem, and/or misconfiguration of a certain infrastructure device 208, for example, a gateway connecting the client device 202 to the network 206. Further assuming, a certain resolution profile, determined using the ML model(s), comprises a set of actions for reconfiguring, resetting, and/or updating the gateway. In such case, the IT assistance engine 220 may transmit the certain resolution profile to a remote agent 224 executed by the router which may execute the set of actions at the gateway to resolve the network connectivity problem of the client device 202.

In another example, as also shown at 142 and 146, the IT assistance engine 220 may transmit one or more of the resolution profile(s) to one or more of the remote agents 224 executed by one or more of the remote services 210 which may apply the set of actions of the received resolution profile(s) to resolve the IT issue(s).

For example, assuming the IT issue relating to the client device 202 is an access problem to a certain remote service 210, for example, a restricted access database, estimated, by the ML model(s) based on the system data, to originate from a failure to update credentials of the user 204 of the client device 202 at the restricted access database. Further assuming, a certain resolution profile, determined using the ML model(s), comprises a set of actions for querying a certain access control database and/or record whether the user 204 is authorized for access to the restricted access database and in case he is authorized, update an access control module of the restricted access database to include the credentials of the user 204. In such case, the IT assistance engine 220 may transmit the certain resolution profile, for example, to a remote agent 224 executed by the restricted access database which may execute the set of actions to resolve the access issue for the user 204 using the client device 202.

In another example, as shown at 130, the IT assistance engine 220 may transmit the certain resolution profile to the remote agent 224 executed by the IT assistance system 200 itself, optionally by the IT assistance engine 220 having access to the remote service and/or infrastructure from which the IT issue is estimated to originate. For example, in case of the access failure issue estimate to originate from the access control database/record and to the access control module, assuming the IT assistance engine 220 has access and manipulation write, adjust, etc.) privileges over these modules, the IT assistance engine 220 may execute the set of actions to resolve the access issue for the user 204 using the client device 202.

In another example, the IT assistance engine 220 may transmit multiple resolution profiles to multiple agents, for example, the local IT assistance agent 222 and one or more remote agents 224, a plurality of remote agents 224, and/or the like. Each of the agents may automatically execute the set of actions of its respective resolution profile such that the agents may jointly resolve the IT issue(s) relating to the client device 202.

For example, assuming the IT issue relating to the client device 202 is a network connectivity problem estimated, by the ML model(s) based on the system data, to originate from a port misconfiguration at the client device 202 and a certain infrastructure device 208, for example, a gateway connecting the client device 202 to the network 206. Further assuming, a solution, determined using the ML model(s), comprises reconfiguring the port number at the client device 202 and at the gateway to be same port. In such case, the IT assistance engine 220 may transmit a first resolution profile comprising a set of actions for reconfiguring the port number at the client device 202 to the local IT assistance agent 222 and a second resolution profile comprising a set of actions for reconfiguring the port number at the gateway to a remote agent 224 executed by the gateway. The local IT assistance agent 222 and the remote agent 224 may each execute the set of actions of their respective resolution profiles to jointly resolve the network connectivity problem of the client device 202.

Optionally, one or more of the actions defined by one or more of the resolution profile(s) may require approval of the user 204 associated with the client device 202. In such case, the entity executing the set of actions defined by the resolution profile(s), for example, the local IT assistance agent 222, the remote agent 224, and/or the IT assistance engine 220 may prompt the user 204 to request approval of the action prior to executing it. For example, assuming, one or more actions of a certain resolution profile require accessing, retrieving, and/or using private data relating to the user 204, for example, credentials, personal information, and/or the like, the user 204 may be asked to approve and/or authorize such actions.

Optionally, the IT assistance engine 220 may store at least part of the system data collected in relation to one or more of the IT issues relating to the client device 202. In particular, the IT assistance engine 220 may store the system data and/or part thereof in one or more online storage resources accessible via the network 206 to one or more of the technicians 254 using their client devices 252.

For example, the IT assistance engine 220 may establish, create, and/or update a ticketing system controlled by one or more ticketing engines which track, collect, and store one or more support tickets comprising data relating to the IT issues reported by the client devices 202. The IT assistance engine 220 may further update the support ticket of one or more of the IT issues to include additional data relating to the respective IT issue, for example, the solution(s), the resolution profile(s), and/or the set of actions generated, and/or determined by the ML model(s) for resolving the respective IT issue.

Optionally, the IT assistance engine 220 may be further adapted to generate an IT issue summary for one or more IT issues relating to the client device 202 based on the system data collected in relation to the respective IT issue. For example, the IT issue summary of one or more IT issues may comprise the system data relating to the respective IT issue and/or part thereof. In another example, the IT issue summary of one or more IT issues may further include the solution(s) and/or resolution profile(s) determined, selected and/or generated for resolving the respective IT issue.

Optionally, the IT assistance engine 220 may apply one or more generative ML models, language models, and/or NLP algorithms for generating the IT issue summary of one or more IT issues relating to the client device 202.

Each of the client device(s) 252 of the technician(s) 254 may execute one or more software modules comprising and/or exposing a user interface enabling the technicians 254 to view, browse, search, and/or otherwise access the stored data, for example, the system data relating to the IT issue, the support ticket, the IT issue summaries, and/or the like. For example, one or more of the client devices 252 used by one or more of the technicians 254 may execute a GUI, for example, a local GUI, a web based GUI, and/or a combination thereof for enabling the technician(s) 254 to access the stored data.

Optionally, one or more technicians 254 using their client devices 252 may adjust one or more of the resolution profiles generated, and/or determined by the ML model(s) for one or more of the IT issues relating to the client device 202. The technician(s) 254 may explore the resolution profile(s) via the GUI, for example, the web based GUI, and may adjust the resolution profile(s), for example, change one or more actions, remove, add and/or replace one or more of the actions, and/or the like.

Optionally, the IT assistance engine 220 may be adapted to check whether reported IT issue(s) are resolved by the set of actions defined by the resolution profile(s) applied to resolve the issue(s). For example, after the resolution profile(s) are applied to resolve the IT issue(s), the IT assistance engine 220 may collect and analyze additional system data relating and/or indicative of the IT issue(s) to determine, evaluate, and/or confirm the reported IT issue(s) is resolved. For example, assuming a certain reported IT issue related to a network connectivity issue at the client device 202. In such case, after one or more resolution profiles are applied to resolve the issue, the IT assistance engine 220 may collect additional system data indicative of network connectivity of the client device 202 and determine accordingly is the network connectivity issue is resolved or not.

Moreover, in case the reported IT issue(s) is not resolve by the resolution profile(s), the IT assistance engine 220 may optionally generate one or more additional resolution profiles, optionally based on additional system data collected in relation to the IT issue(s), as described in steps 124 and 126 of the process 120, and instruct applying the additional resolution profile(s) as described in steps 110, 130 and/or 146 in attempt to resolve the IT issue(s).

Figure 3:
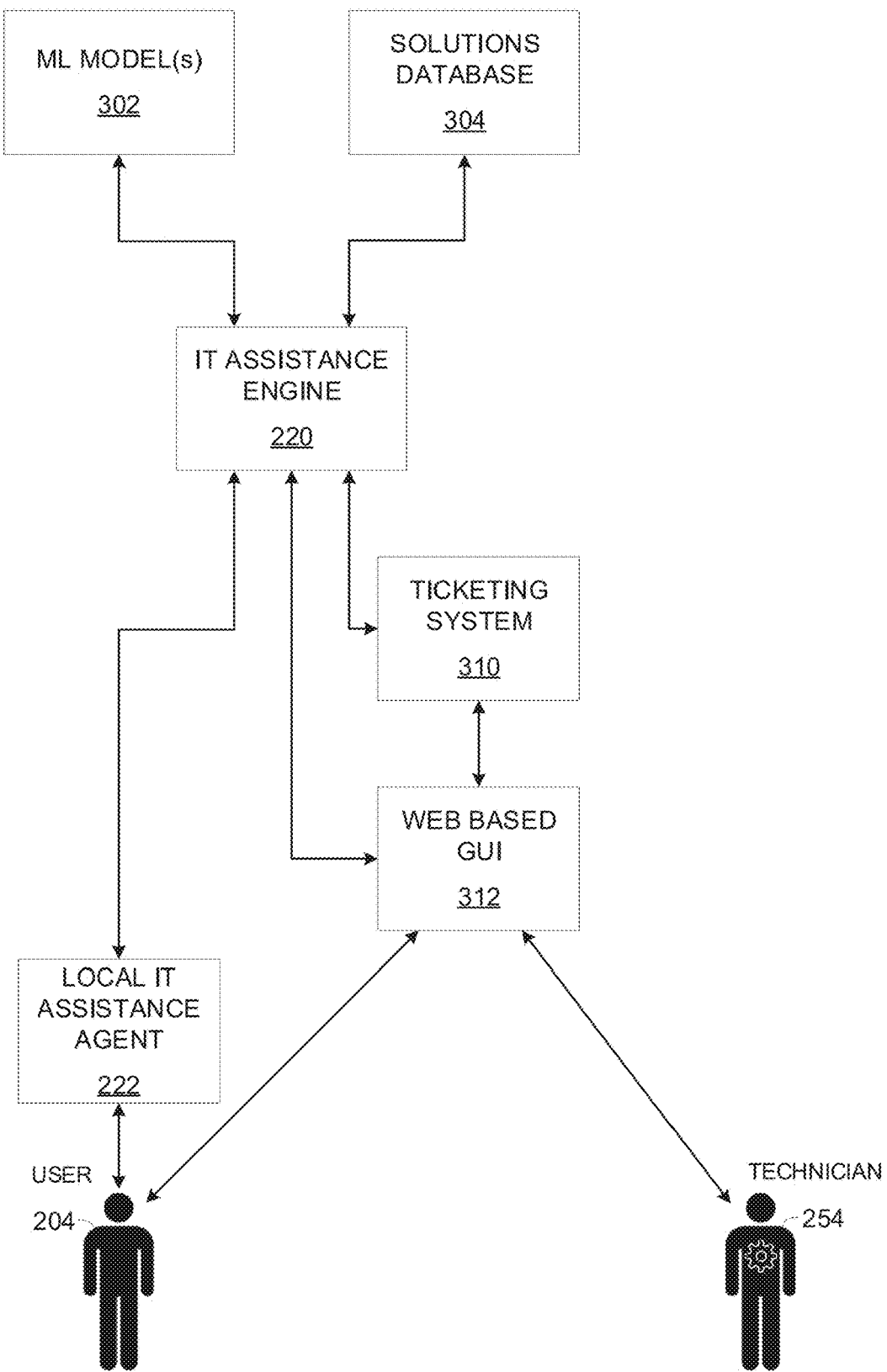
FIG. 3 is a schematic illustration of exemplary building blocks of a system for automatically resolving IT issues using machine learning models, according to some embodiments of the present invention.

Reference is now made to FIG. 3, which is a schematic illustrations of exemplary building blocks of a system for automatically resolving IT issues using machine learning models, according to some embodiments of the present invention.

A local IT assistance agent such as the local IT assistance agent 222 may be executed by a client device such as the client device 202 used by an associated user such as the user 204 for resolving one or more IT issues relating to the client device 202. In particular, upon detection of one or more IT issues, the local IT assistance agent 222 may request an IT assistance engine such as the IT assistance engine 220 to resolve the identified IT issue(s).

The IT assistance engine 220 executed by an IT assistance system such as the IT assistance system 200 may apply one or more ML models 302 adapted to automatically identify, infer, derive, and/or otherwise determine one or more resolution profiles comprising a set of actions implementing one or more solutions estimated to resolve the IT issue(s) reported by the local IT assistance agent 222.

Optionally, the IT assistance engine 220 and/or ML model(s) 302 may determine one or more solutions according to a solutions database storing possible solutions for a plurality of IT issues which were applied in the past and proved to at least partially successfully resolve the IT issues.

Optionally, the user 204 may interact with the local IT assistance agent 222 and/or the IT assistance engine 220 through a user interface, for example, a GUI, optionally a web based GUI 312 to provide user input and optionally receive instructions to support resolving the IT issue(s).

Optionally, one or more technicians such as the technician 254 using client devices such as the client device 252 may also interact with the IT assistance engine 220, for example, to assist in resolving one or more IT issues relating to one or more client devices 202 used by respective users 204. Typically, the technician(s) 254 may access a ticketing system 310 controlled by one or more ticketing engines which tracks, collects, and stores a plurality of support tickets comprising data relating to the IT issues reported by the client devices 202. The technician(s) 254 may therefore retrieve data relating to reported IT issues, including active IT issues currently handled and may track, monitor, and/or adjust one or more of the solutions determined by the IT assistance engine 220 for resolving one or more of the logged IT issues.

Optionally, the IT assistance engine 220 may be further adapted to monitor and estimate an operational state (health) of one or more of the plurality of functional components relating to one or more of the plurality of client devices 202. The monitored functional components may comprise one or more local functional component such as the functional components 248 of the respective client device 202. In another example, monitored functional components may comprise one or more remote functional components of systems, platforms, and/or services serving the respective client device 202. For example, the remote functional components may comprise one or more functional components of one or more of the remote services 210 serving the respective client devices 202. In another example, the remote functional components may comprise one or more functional components of one or more of the infrastructure systems 208 serving the respective client device 202.

To this end, the IT assistance engine 220 may collect system data, for example, informative data relating to relating to one or more of the client devices, specifically system data relating to one or more of functional components relating to one or more of the plurality of client devices 202.

The system data (i.e., type, scope, parameters, settings, details, etc.) which is collected for the health check evaluation may be predefined, and/or learned by the IT assistance engine 220, specifically by the AI model(s) according to past (historical) system data patterns identified as indicative of proper and/or failed operation of the functional components. Optionally, the system data and/or informative data, for example, type of data, scope of data, operational parameters, settings, details, and/or the like may be adjusted, selected, and/or defined according to an organizational knowledge base established, accumulated and/or learned over time by one or more organizations with which the users 204 and/or client devices 202 are associated, for example, a company, an institute, a firm, and/or the like.

In order to evaluate the operational state of the functional components, the IT assistance engine 220 may collect system data according to one or more operating modes. For example, the IT assistance engine 220 may periodically, continuously and/or on demand, i.e., in response to a trigger, collect system data relating to one or more of the client devices, specifically system data relating to one or more of functional components relating to one or more of the plurality of client devices 202.

The IT assistance engine 220 may analyze the collected system data, for example, using one or more ML models, to evaluate whether the monitored functional components operate as expected, for example, according to proper execution patterns, or whether the system data may be indicative of one or more potential failures, IT issues, and/or the like.

In order to effectively monitor and estimate the operational state (health check) of one or more of the plurality of functional components relating to the client device 202, the IT assistance engine 220 may need to interact with one or more of the remote agents 224, for example, collect system data used to estimate the operational state, apply one or more actions for resolving one or more potential issues and/or the like. As described herein before, the remote agents 224 may be designed, implemented, and/or deployed to support this operational state evaluation using one or more integration, migration, and/or development methods, techniques, and/or means, for example, a plug-in module, an add-on package, an SDK, and/or the like comprising operational state evaluation monitoring, logic, and/or controls functionality.

The IT assistance engine 220 and the local IT assistance agent 222 may be designed, constructed, deployed, and/or operated according to one or more design architectures, implementations, and/or the like.

Reference is now made to FIG. 4, FIG. 5, FIG. 6, and FIG. 7, which are schematic illustrations of exemplary designs of a system for automatically resolving IT issues using machine learning models, according to some embodiments of the present invention.

Figure 4:
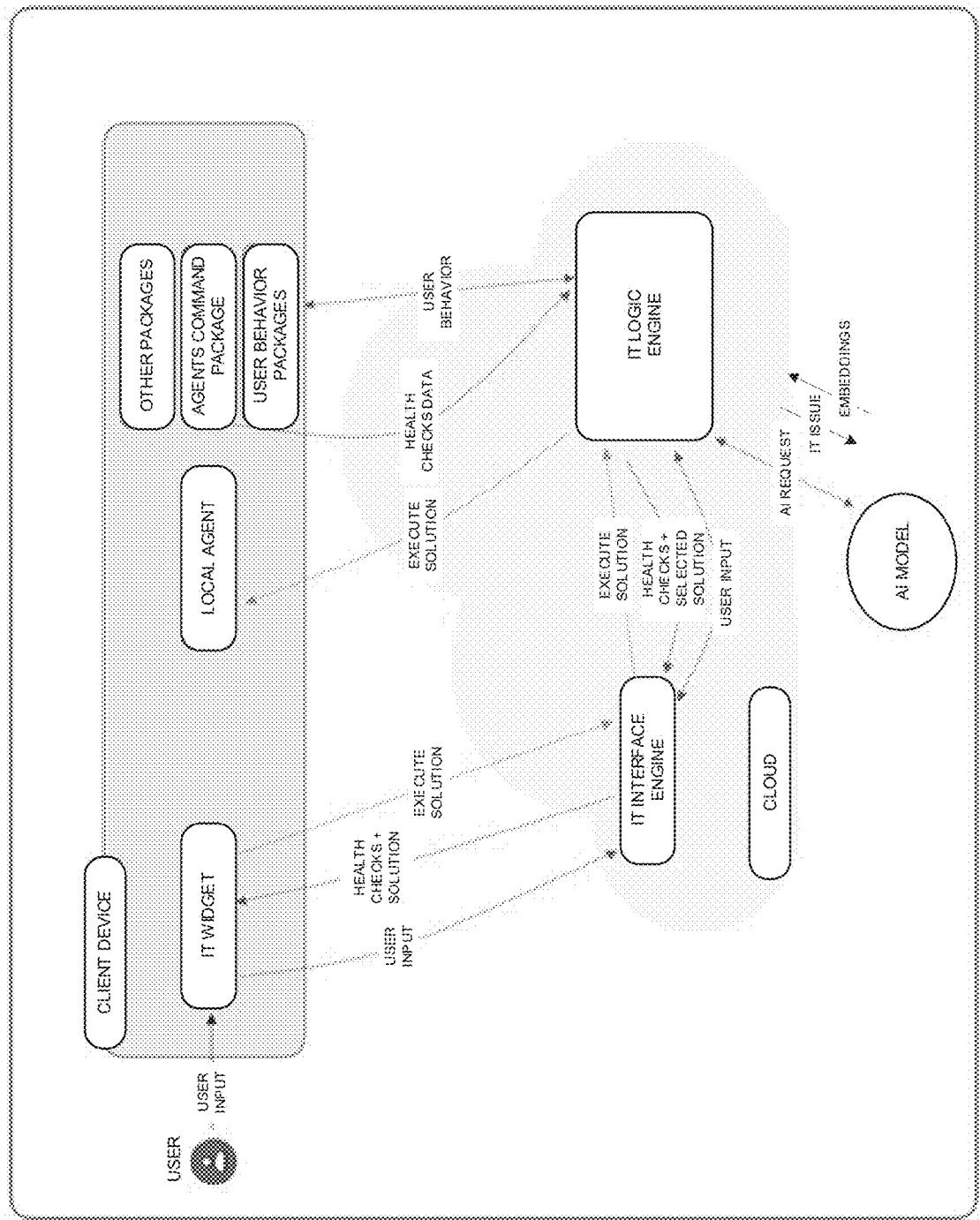
FIG. 4, FIG. 5, FIG. 6, and FIG. 7 are schematic illustrations of exemplary designs of a system for automatically resolving IT issues using machine learning models, according to some embodiments of the present invention.

As seen in FIG. 4, an exemplary local IT assistance agent such as the local IT assistance agent 222 executed by a client device such as the client device 202 may be implemented using a plurality of functional modules, specifically, software modules, for example, an IT widget, a local agent, an agents command package, a user behavior package and one or more other packages.

The local IT assistance agent 220 may communicate with an exemplary cloud based IT assistance engine such as the IT assistance engine 220 constructed of a plurality of functional modules, specifically, software modules, for example, an IT interface engine adapted to control interaction with client devices 202 and their associated users such as the use 204, and an IT logic engine comprising the core logic of the IT assistance engine 220.

The IT widget may be adapted to facilitate a user interface, for example, a GUI for interacting with the user 204 to receive user input, specifically user input provided in relation to one or more IT issues relating to the client device. The IT widget may be further adapted to transmit the user input provided by the user to the remote IT assistance engine 220, specifically to the IT interface engine facilitating a chat engine driving the GUI interface at the IT widget.

The IT interface engine may be further adapted to deliver, forward and/or transmit the user input to the IT logic engine comprising the core logic of the IT assistance engine 220 and thus adapted to collect system data relating to IT issues relating to the client device, communicate with one or more AI models such as the ML model 302.

The user behavior package may log interaction of the user with the client device and/or content presented by the client device, specifically user interaction logged in relation to one or more IT issues relating to the client device, and transmit the user behavior data to the IT logic engine.

The IT logic engine may collect system data relating to one or more IT issues relating to the client device, for example, the user input, the user behavior data and also informative data comprising operational data relating to one or more functional components of the client device and/or of one or more services serving the client device.

The AI model may be adapted to determine resolution profiles for resolving IT issues relating to the client devices based on the system data received from the IT logic engine. In particular, the IT logic engine may issue a query (prompt, request) to the AI model which may comprise the IT issue, specifically the system data relating to the IT issue. Based on the received IT issue, the AI model may generate Embeddings which may comprise a feature vector comprising features (values) extracted from the received system data.

The Embeddings, i.e., the feature vector generated by the AI model may be used, for example, by the IT logic engine, and/or the AI model to conduct a semantic search in an IT solutions space to identify one or more best matching feature vectors associated with solutions to IT issues. Matching vectors may be indicative that the associated solutions may be applied to solve IT issues characterized and/or mapped by the respective system data.

The IT logic engine may transmit one or more solutions estimated by the AI model to resolve the IT issue, specifically resolution profiles comparing actions implementing the solutions, to the local agent, and/or to the IT widget at the client device which may execute the actions to resolve the IT issue.

As described herein before, the operational state (health) of one or more of the functional components relating to the client device may be estimated independently of any IT issues, for example, continuously, periodically and/or in response to a trigger.

To this end. the agents command package may be adapted to collect system data, for example, informative data, user behavior data, and/or the like, independently of IT issues and transmit the collected system data to the IT logic engine. Optionally, the agents command package may collect system data according to instructions of the IT logic engine which may define the system data requirements according to the operational state (health) checks defined for the client device.

Based on the system data received from the agents command package, optionally coupled with user input received from the IT widget, the IT logic engine, optionally using the AI model, may estimate the operational state, i.e., the health of one or more of the functional components relating to the client device.

Figure 5:
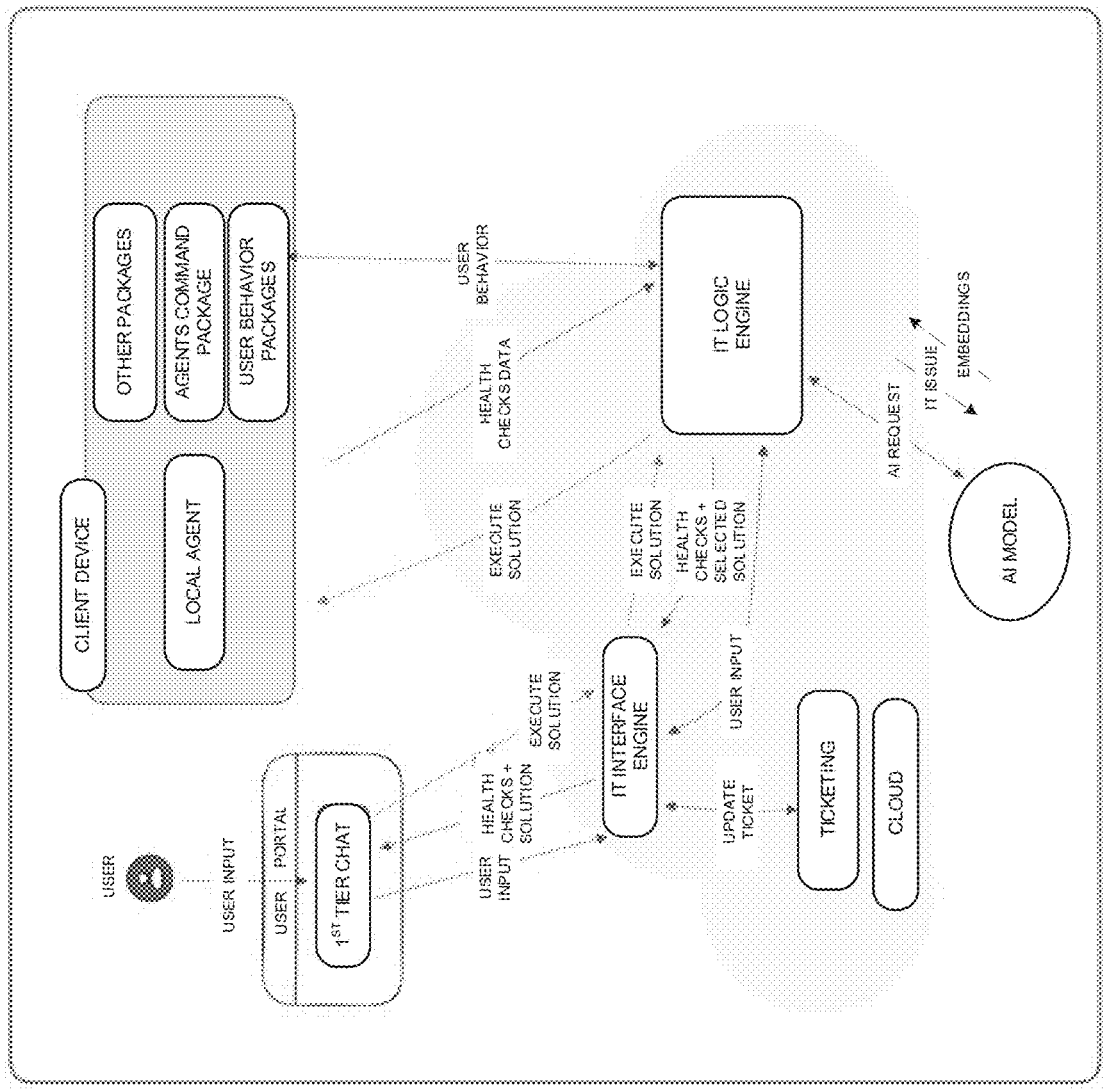

As seen in FIG. 5, the user may optionally interact with the cloud based IT assistance engine, specifically with the IT interface engine via a user portal serving as a $1^{st}$ tier chat interface rather than via the IT widget executed by the client device. Moreover, the user may access the user portal using a different client device than the one to which the IT issue(s) relate. The AI assistance engine may further maintain a ticketing module, for example, a database, a record, a system, and/or the like storing a plurality of support tickets tracking a plurality of IT issues relating to a plurality of client devices. Via the user portal, one or more users may view, browse, check and optionally update one or more of the support tickets.

Figure 6:
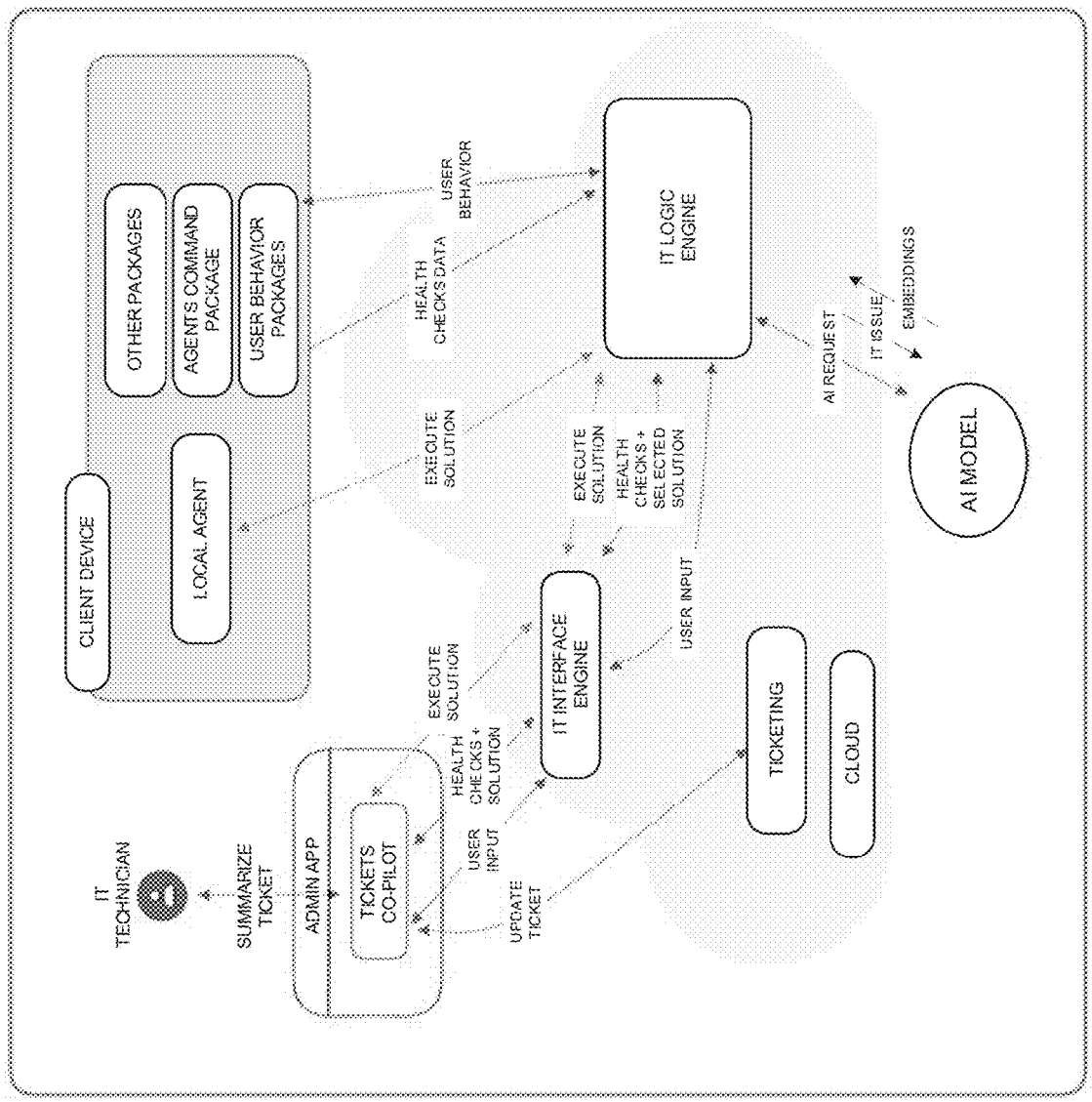

As seen in FIG. 6, one or more human technicians such as the technician 254 using respective client devices such as the client device 252 may access the IT assistance engine. For example, the technician 254 may launch an admin application on his client device 252 which may execute a ticket co-pilot engine through which the technician may access one or more of the support tickets to track, intervene, and/or follow-up on one or more IT issues.

Figure 7:
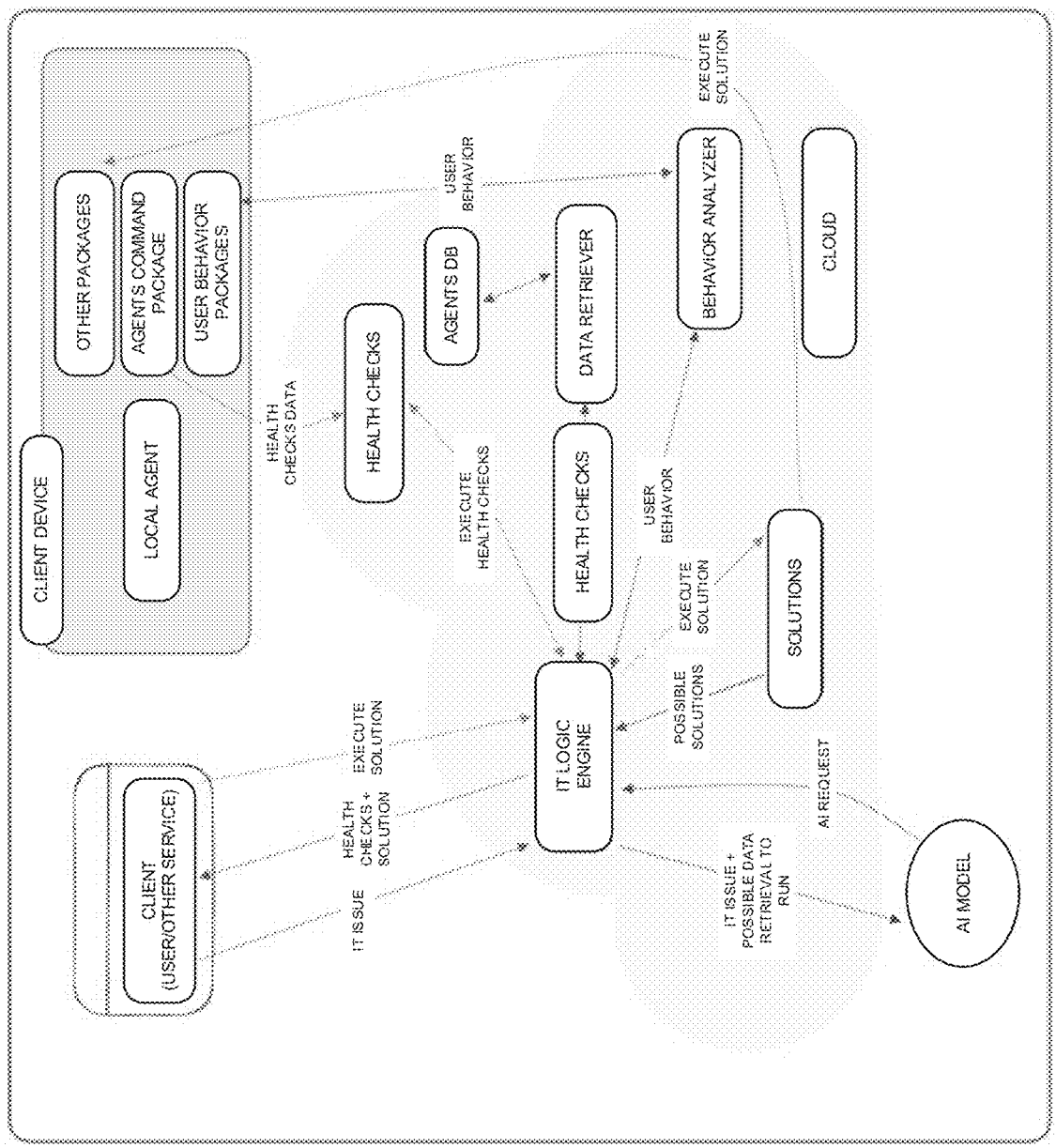

As seen in FIG. 7, the cloud based IT assistance engine, specifically the IT logic engine, may be constructed of a plurality of software modules each designed and adapted to execute a respective functionality of the IT logic engine. At least some of the software modules may communicate with each other to transfer data among them. For example, a health checks module may define operational state (health) checks for execution by one or more client devices, optionally also defining the type, scope, etc. of system data to be collected and deliver it to agents command package at the client device(s). In another example, a solutions module may be deployed to identify, determine, and/or select from a solutions space one or more solutions estimated to effectively resolve each IT issue relating to the client devices. In another example, a behavior analyzer may be executed to analyze user behavior data logged, for example, by the user behavior package at the client device, to provide insights regarding possible solutions for resolving one or more IT issues relating to one or more client devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms client devices, ML models and pre-trained generative models are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for automatically resolving information technology (IT) issues, the system comprising:
   a plurality of IT assistance agents, wherein each of the plurality of IT assistance agents executes on a respective one of a plurality of client devices; and
   a remote server communicatively coupled to the plurality of IT assistance agents via a network, wherein the remote server is configured to:
      receive, from a first agent of the plurality of IT assistance agents, an assistance request, and
      in response to receiving the assistance request:
         identify at least one IT issue relating to a corresponding one of the plurality of client devices on which the first agent is executing, wherein identifying the at least one IT issue is performed by providing an input based on the assistance request to at least one of a set of machine learning models,
         determine, using the set of machine learning models, one or more system tests related to the at least one IT issue, wherein the one or more system tests are defined by at least one of the set of machine learning models that is configured to estimate usefulness of system data derived from the one or more system tests for resolving the at least one IT issue,
         conduct, via the first agent, one or more system tests to generate the system data related to the at least one IT issue,
         collect the system data relating to the at least one IT issue,
         automatically determine at least one resolution profile using the set of machine learning models applied to analyze the system data, wherein the at least one resolution profile includes a set of actions implementing at least one solution for resolving the at least one IT issue, and
         transmit the at least one resolution profile to the first agent to instruct the first agent to automatically execute the set of actions to resolve the at least one IT issue.

2. The system of claim 1, wherein the at least one IT issue relates to at least one of:
   at least one of a plurality of functional components of the plurality of client devices, wherein each of the plurality of functional components is implemented via hardware, software and/or a combination thereof,
   at least one remote service serving the plurality of client devices, and
   at least one infrastructure serving the plurality of client devices.

3. The system of claim 1, wherein the first agent includes:
   a respective agent of the plurality of IT assistance agents, and
   at least one remote agent executed by at least one server having access to at least one remote service and/or infrastructure serving the plurality of client devices.

4. The system of claim 1, wherein:
   the system data includes informative data collected by a respective agent of the plurality of IT assistance agents, the informative data includes at least one of:
at least one operational parameter relating to at least one of a plurality of functional components of the plurality of client devices,
a software application,
a service, or
an account related to the plurality of client devices, and
each of the plurality of functional components is implemented via hardware, software and/or a combination thereof.

5. The system of claim 1, wherein the system data includes service data collected from at least one remote service serving the plurality of client devices.

6. The system of claim 1, wherein:
the system data includes user behavior data collected by a respective agent of the plurality of IT assistance agents, and
the user behavior data includes information about user interaction with the plurality of client devices.

7. The system of claim 1, wherein:
the system data includes user input relating to the at least one IT issue, and
the user input collected by a respective agent of the plurality of IT assistance agents, is provided by a user of the plurality of client devices.

8. The system of claim 7, wherein the remote server is configured to apply natural language processing for interpreting the user input.

9. The system of claim 7, wherein the remote server is configured to invoke at least one chat interface for interacting with a user of the plurality of client devices to receive the user input.

10. The system of claim 1, wherein the set of machine learning models uses at least one dataset associating at least one resolution profile of a plurality of resolution profiles with each of a plurality of client device IT issues.

11. The system of claim 10, wherein the at least one resolution profile of the plurality of resolution profiles associated with the plurality of client device IT issues includes a respective set of actions defined by at least one technician for resolving the at least one IT issue.

12. The system of claim 1, wherein the set of machine learning models includes at least one generative machine learning model adapted to automatically define the set of actions for resolving the at least one IT issue.

13. The system of claim 1, wherein the remote server is configured to generate an IT issue summary based on the system data for display by a technician client device used by at least one technician to enable the at least one technician to adjust the at least one resolution profile.

14. The system of claim 1, wherein the remote server is configured to store the system data in at least one online storage resource accessible to at least one technician using a client device executing a web based graphical user interface.

15. The system of claim 1, wherein:
the remote server is configured to estimate an operational state of at least one of a plurality of functional components relating to at least one of the plurality of client devices based on system data collected in relation to the plurality of client devices, and
each of the plurality of functional components is at least one of a local functional component of the plurality of client devices or a remote functional component serving the plurality of client devices.

16. The system of claim 1, wherein a respective agent of the plurality of IT assistance agents is implemented by at least one of:
a web page rendered by at least one web browser,
a web application, or
a local application.

17. The system of claim 1, wherein the remote server is configured to:
determine whether the at least one IT issue has been resolved by the at least one resolution profile;
in response to a determination that the at least one IT issue has not been resolved, determine, using at least one of the set of machine learning models, one or more additional system tests;
conduct, via the first agent, the one or more additional system tests to generate additional system data;
determine, based on the additional system data and using the set of machine learning models, a root cause of the at least one IT issue;
automatically determine a second resolution profile using the set of machine learning models, wherein the second resolution profile includes a second set of actions implementing a second solution for resolving the root cause; and
transmit the second resolution profile to the first agent to instruct the first agent to automatically execute the second set of actions to resolve the root cause.

18. A method of automatically resolving information technology (IT) issues, the method comprising:
receiving, from a first agent of a plurality of IT assistance agents, an assistance request; and
in response to receiving the assistance request,
identifying at least one IT issue relating to at least one client device of a plurality of client devices, wherein:
each of the plurality of IT assistance agents executes on a respective one of the plurality of client devices, and
identifying the at least one IT issue is performed by providing an input based on the assistance request to at least one of a set of machine learning models,
determining, using the set of machine learning models, one or more system tests related to the at least one IT issue, wherein the one or more system tests are defined by at least one of the set of machine learning models that is configured to estimate usefulness of system data derived from the one or more system tests for resolving the at least one IT issue,
conducting, via the first agent, one or more system tests to generate the system data related to the at least one IT issue,
collecting the system data relating to the at least one IT issue,
automatically determining at least one resolution profile using the set of machine learning models applied to analyze the system data, wherein the at least one resolution profile includes a set of actions implementing at least one solution for resolving the at least one IT issue, and
transmitting the at least one resolution profile to the first agent to instruct the first agent to automatically execute the set of actions to resolve the at least one IT issue.

19. A client device comprising at least one processor configured to execute a local IT assistance agent that is configured to:

communicate via at least one network with a remote IT assistance engine executed by at least one remote server;

transmit an assistance request to the remote IT assistance engine for resolving at least one IT issue;

receive a request from the remote IT assistance engine to conduct one or more system tests related to the at least one IT issue, wherein:

the at least one IT issue is identified by providing an input based on the assistance request to at least one of a set of machine learning models, the one or more system tests are determined using the set of machine learning models, and at least one of the set of machine learning models is configured to estimate usefulness of system data derived from the one or more system tests for resolving the at least one IT issue;

conduct the one or more system tests to generate the system data related to the at least one IT issue;

transmit the system data to the remote IT assistance engine;

receive at least one resolution profile from the remote IT assistance engine, wherein:

the at least one resolution profile is determined automatically by the remote IT assistance engine using the set of machine learning models, the set of machine learning models is applied to analyze system data collected by the remote IT assistance engine in relation to the at least one IT issue, and the at least one resolution profile includes a set of actions implementing at least one solution for resolving the at least one IT issue; and automatically execute the set of actions to resolve the at least one IT issue.

\* \* \* \* \*